United States Patent
Lee

(10) Patent No.: US 7,864,208 B2
(45) Date of Patent: Jan. 4, 2011

(54) F-θ LENS, LIGHT SCANNING UNIT AND IMAGE FORMING APPARATUS EMPLOYING THE SAME

(75) Inventor: Tae-kyoung Lee, Seongnam-si (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 344 days.

(21) Appl. No.: 11/907,666

(22) Filed: Oct. 16, 2007

(65) Prior Publication Data
US 2008/0170114 A1    Jul. 17, 2008

(30) Foreign Application Priority Data
Jan. 16, 2007    (KR) .................. 10-2007-0004642

(51) Int. Cl.
    *G02B 26/10*    (2006.01)
(52) U.S. Cl. .................. 347/256; 347/244
(58) Field of Classification Search ............ 359/819; 347/245, 257, 244, 256
    See application file for complete search history.

(56) References Cited

U.S. PATENT DOCUMENTS 5,245,481 A    9/1993   Kaneko et al.
5,377,038 A *  12/1994  Uzuki et al. ............ 359/205.1
2007/0058233 A1 * 3/2007 Kim et al. ............... 359/207

FOREIGN PATENT DOCUMENTS

| EP | 0493805 | 7/1992 |
| JP | 62-293213 | 12/1987 |
| JP | 7-164453 | 6/1995 |
| JP | 2003-241083 | 8/2003 |
| JP | 2006-113382 | 4/2006 |
| KR | 10-0631220 | 10/2006 |

OTHER PUBLICATIONS

European Search Report issued Mar. 31, 2009 in EP Application No. 08100303.0.
Chinese Office Action issued Sep. 17, 2010 in CN Application No. 200810000778.7.

* cited by examiner

*Primary Examiner*—Huan H Tran
(74) *Attorney, Agent, or Firm*—Stanzione & Kim LLP

(57) ABSTRACT

An f-θ lens is joined to a mount through a light curable bond, forms an incident deflected beam onto a photosensitive body, and includes a lens part which has an incident side on which the deflected beam is incident, and an exiting side which is disposed near the photosensitive body and on which the entered deflected beam is exited, an joining part which has a joining side which is extended from the incident face and is joined to the mount, and an emitting side which is extended from the exiting face and disposed to face the joining side, and which a light beam for curing the light curable bond is scanned, and an emitting part which is formed on the emitting side in a non-planar shape and provided to decrease loss of light quantity of the light beam scanned on the emitting face, so that the f-θ lens provides an improved joining force in a joining process by a light cure joining type.

10 Claims, 13 Drawing Sheets

FIG. 1
(CONVENTIONAL)
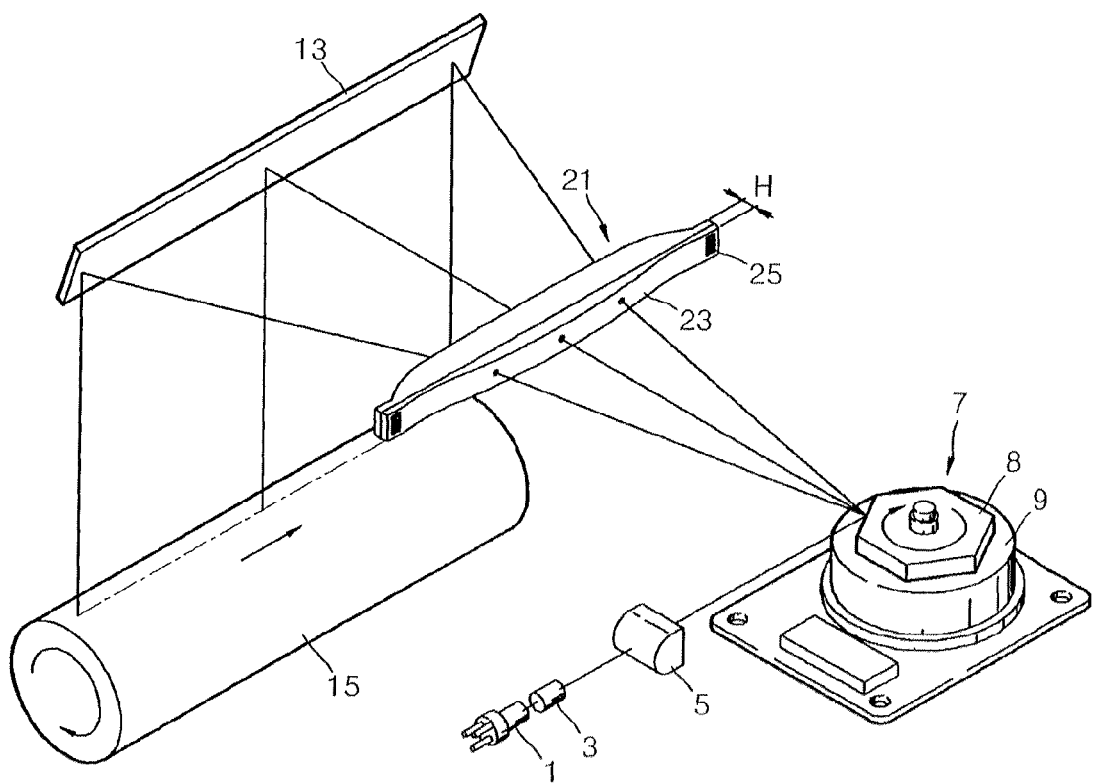

FIG. 2
(CONVENTIONAL)
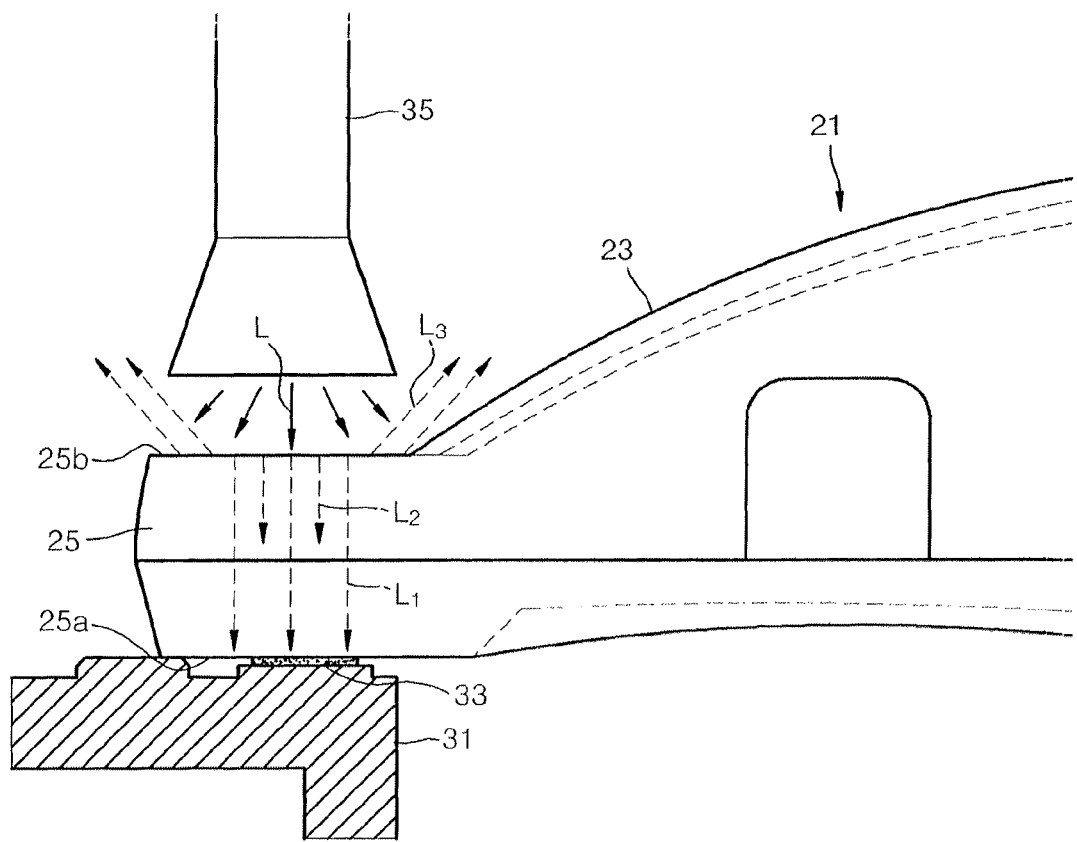

F-θ LENS, LIGHT SCANNING UNIT AND IMAGE FORMING APPARATUS EMPLOYING THE SAME

CROSS-REFERENCE TO RELATED APPLICATIONS

This application claims priority from Korean Patent Application No. 10-2007-0004642, filed on Jan. 16, 2007 in the Korean Intellectual Property Office, the disclosure of which is incorporated herein in its entirety by reference.

BACKGROUND OF THE INVENTION

1. Field of the Invention

The present general inventive concept relates to an f-θ lens which scans a beam radiated from a light source onto an exposure body, a light scanning unit and an image forming apparatus employing the same, and more particularly, to an f-θ lens having an improved joining force during an joining process by a light curable joining type, a light scanning unit and an image forming apparatus employing the same.

2. Description of the Related Art

In general, a light scanning unit is employed for devices such as a laser printer, a digital photocopier, a facsimile, and so on. The light scanning unit forms a latent image on a photosensitive body through a main scanning by a beam deflector, and a sub scanning by rotation of a photosensitive body.

FIG. 1 is a schematic view illustrating an optical arrangement of a conventional light scanning unit. As illustrated in FIG. 1, the conventional light scanning unit includes a light source 1 which generates and radiates a beam, a beam deflector 7 which deflects an incident beam so that the beam radiated from the light source 1 can be main-scanned onto a photosensitive body 15, and an f-θ lens 21 which corrects an error included in the beam deflected by the beam deflector 7. Also, on an optical path between the light source 1 and the beam deflector 7 are further provided a collimating lens 3 which collimates the beam radiated from the light source 1, and a cylindrical lens 5 which shapes the collimated beam. Between the f-θ lens 21 and the photosensitive body 15 is disposed a reflecting mirror 13 which changes a direction of the scanned beam.

The beam deflector 7 includes a driving source 9, and a rotational polygon mirror 8 rotated by the driving source 9. Accordingly, the beam radiated from the light source 1 changes its direction according to rotation of the rotational polygon mirror 8 and its scanning direction is determined.

The f-θ lens 21 includes only a singular lens so as to reduce the number of parts and a manufacturing cost. In this case, astigmatism included in the beam deflected by the beam deflector 7 is corrected, and the scanning line is corrected to maintain an isometric line and isometric angle through the f-θ lens 21 including the singular lens above-described.

However, for this purpose, the f-θ lens 21 must have a thicker lens in comparison with a conventional f-θ lens including two lenses. Thus, a lens part 23 in the f-θ lens 21 for image-forming of the scanning beam has a thicker thickness than in a conventional f-θ lens including two lenses. Also, a joining part 25 which is extended from the lens part 23 to be joined to a mount (see 31 in FIG. 2) has a relatively thicker thickness H so as to stably support the lens part 23.

Meanwhile, the f-θ lens 21 should be installed in the mount 31 having the same configuration as that illustrated in FIG. 2 so as to dispose the above-described optical arrangement.

FIG. 2 is a schematic view showing a joining process employing an ultraviolet ray curable resin of the conventional f-θ lens.

As shown in FIG. 2, the joining part 25 is installed on the mount 31. At this time, between the mount 31 and a joining face 25a of the joining part 25 is spread an ultraviolet curable bond 33 which is cured by ultraviolet ray. After that, an ultraviolet ray L is emitted through an opposite face 25b of the joining part 25. Here, the ultraviolet ray L is emitted through an optical fiber 35 or a light source (not shown) disposed to face the opposite face 25b of the joining part 25.

A first portion $L_1$ of the emitted ultraviolet ray passes through the joining part 25 to be emitted on the ultraviolet curable bond 33, and a second portion $L_2$ of the emitted ultraviolet ray is absorbed inside the joining part 25, and a third portion $L_3$ of the emitted ultraviolet ray is surface-reflected on the opposite face 25b of the joining part 25.

Accordingly, since the thickness of the joining part 25 is relatively thicker if the f-θ lens 21 is joined to the mount 31 in the above-described method, such absorption and surface-reflection in the joining part 25 cause a large light loss, thereby depreciating a joining efficiency.

Therefore, a facility cost factor may be generated since an ultraviolet emitting unit and an ultraviolet lamp which have more large light quantity and capacity are needed so as to join the f-θ lens, and also, if an ultraviolet emitting time is increased so as to obtain a predetermined hardness, an assembling time for joining is increased, thereby depreciating productivity.

SUMMARY OF THE INVENTION

The present general inventive concept provides an f-θ lens having a configuration provided to reduce a joining time without an additional facility for an ultraviolet emitting unit, a light scanning unit and an image forming apparatus employing the same.

Additional aspects of the present general inventive concept will be set forth in part in the description which follows and, in part, will be obvious from the description, or may be learned by practice of the present general inventive concept.

The foregoing and/or other aspects and utilities of the prevent general inventive concept may be achieved by providing an f-θ lens which is joined to a mount through a light curable bond, and forms an incident deflected beam onto a photosensitive body, the f-θ lens including a lens part which has an incident face on which the deflected beam is incident, and an exiting face which is disposed near the photosensitive body and on which the entered deflected beam is exited, a joining part which has a joining face which is extended from the incident face and is joined to the mount, and an emitting face which is extended from the exiting face and disposed to face the joining face, and on which a light beam for curing the light curable bond is emitted, and an emitting part which is formed on the emitting face in a non-planar shape, and provided to decrease loss of light quantity of the light beam scanned on the emitting face.

The foregoing and/or other aspects and utilities of the prevent general inventive concept may also be achieved by providing a light scanning unit, including a light source which radiates light, a beam deflector which deflects the beam radiated from the light source onto a main scanning direction of a photosensitive body, and an f-θ lens including a lens part which has an incident face on which the deflected beam is incident, and an exiting face which is disposed near the photosensitive body and on which the entered deflected beam is exited, a joining part which has a joining face which is extended from the incident face and is joined to the mount, and an emitting face which is extended from the exiting face and disposed to face the joining face, and on which a light beam for curing the light curable bond is emitted, and an emitting part which is formed on the emitting face in a non-planar shape, and provided to decrease loss of light quantity of the light beam scanned on the emitting face, and to form image with the deflected beam on the photosensitive body.

The foregoing and/or other aspects and utilities of the prevent general inventive concept may also be achieved by providing an image forming apparatus including a photosensitive body on which an electrostatic latent image is formed; a light scanning unit according to the above description which scans beam to form an electrostatic latent image on the photosensitive body, a developing unit which forms a toner image on the photosensitive body, a transfer unit which transfers the toner image formed on the photosensitive body onto a printing medium, and a fusing unit which fuses the image transferred on the printing medium.

The foregoing and/or other aspects and utilities of the prevent general inventive concept may also be achieved by providing an f-θ lens usable with a light scanning unit of an image forming apparatus, the f-θ lens including a lens part having a first lens function to control an incident beam passing through the lens part, a joining part extended from the lens part, and an emitting part formed in the joining part to have a second lens function to control a light beam passing through the joining part.

The foregoing and/or other aspects and utilities of the prevent general inventive concept may also be achieved by providing an f-θ lens usable with a light scanning unit of an image forming apparatus, the an f-θ lens including a lens part having a thickness varying in a lengthwise direction to control an incident beam passing therethrough, a joining part extended from the lens part and having a second thickness in the lengthwise direction, and an emitting part formed in the joining part and having a thickness varying with respect to the lengthwise direction to control a light beam passing therethrough.

BRIEF DESCRIPTION OF THE DRAWINGS

These and/or other aspects and utilities of the present general inventive concept will become apparent and more readily appreciated from the following description of the embodiments, taken in conjunction with the accompanying drawings of which:

FIG. 1 is a schematic view illustrating an optical arrangement of a conventional light scanning unit;

FIG. 2 is a schematic view illustrating a joining process of a conventional f-θ lens of the conventional light scanning unit of FIG. 1;

DETAILED DESCRIPTION OF THE PREFERRED EMBODIMENTS

Figure 3:
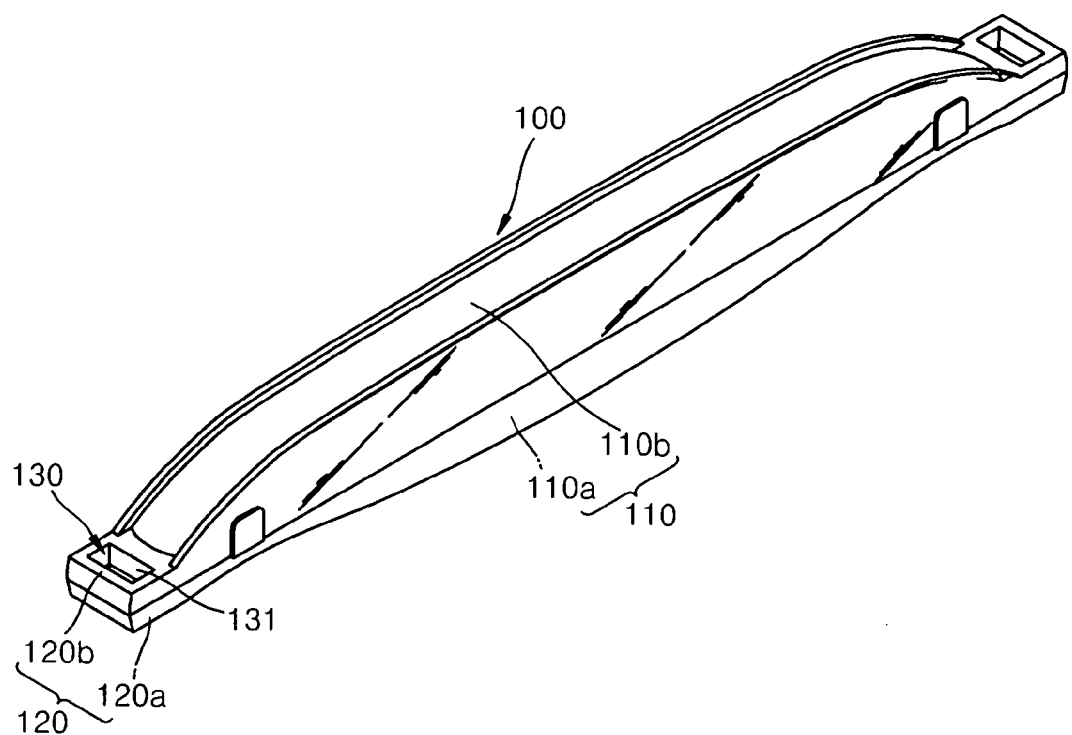
FIG. 3 is a perspective view illustrating an f-θ lens according to an exemplary embodiment of the present general inventive concept.

Reference will now be made in detail to the embodiments of the present general inventive concept, examples of which are illustrated in the accompanying drawings, wherein like reference numerals refer to like elements throughout. The embodiments are described below so as to explain the present general inventive concept by referring to the figures.

Figure 4A:
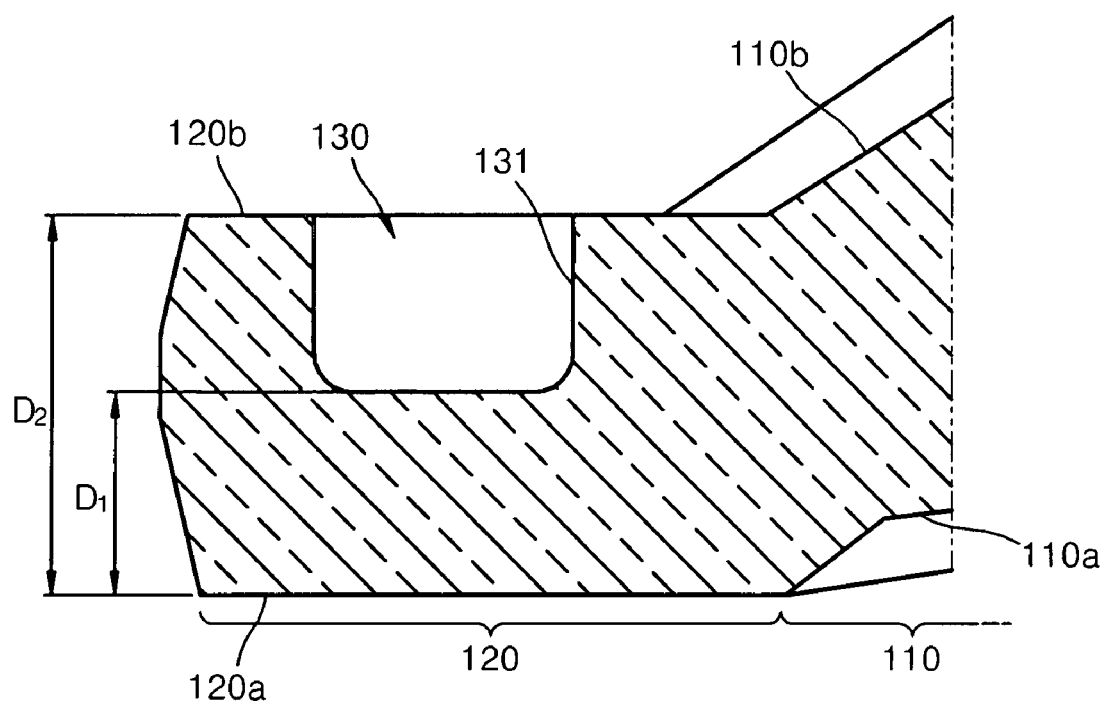
FIG. 4A is a sectional view illustrating the f-θ lens of FIG. 3 according to an exemplary embodiment of the present general inventive concept.
Figure 4B:
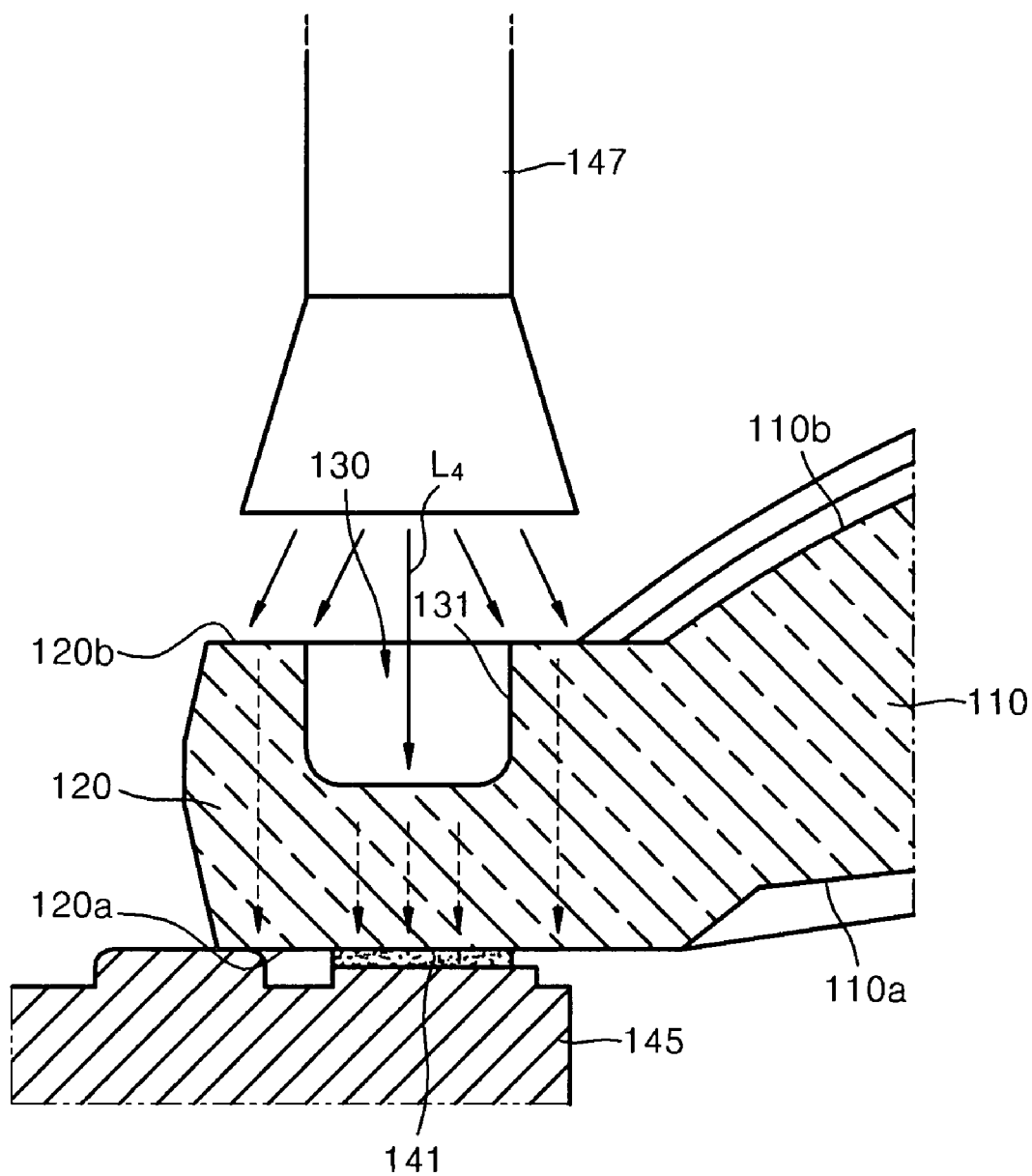
FIG. 4B is a sectional view illustrating a joining process of an f-θ lens according to an exemplary embodiment of the present general inventive concept.

As illustrated in FIGS. 3, 4A and 4B, an f-θ lens 100 according to an exemplary embodiment of the present general inventive concept includes a lens part 110 which corrects an incident beam deflected in a different ratio with respect to a main scanning and a sub scanning direction to form an image on a photosensitive body (see 245 in FIG. 8), an joining part 120 which is extended from the lens part 110 to be joined on a mount 145 by a light curable bond 141, and an emitting part 130 provided on an area of the joining part 120 to receive a light beam for curing the light curable bond 141. Here, the main scanning direction denotes a direction to which beam is deflected by a beam deflector (see 210 in FIG. 8), and the sub scanning direction denotes a direction which corresponds to a moving direction of the photosensitive body 245.

The lens part 110 denotes an area having a lens function of the f-θ lens 100, that is, a portion of the f-θ lens 100 having a lens function to correct the incident beam from a beam reflector. The lens part 110 includes an incident side (or surface) 110a on which the deflected beam is incident, and an exiting side (or surface) 110b which is disposed near the photosensitive body 245 and on which the incident deflected beam is exited.

The joining part 120 includes a joining side 120a which is extended from the incident face 110a to be joined to the mount 145, and an emitting side 120b which is disposed to face the joining face 120a and on which a light beam $L_4$ is scanned to sure the light curable bond 141.

The emitting part 130 is formed in a non-planar shape on the emitting face 120b to decrease loss of light quantity of the light beam incident to the joining part 120. That is, if the entire f-θ lens 100 is joined with the mount 145 through the joining part 120, the emitting part 130 secures a joining stability and decreases loss of light quantity caused due to surface reflection and internal absorption of light beam for curing the light curable bond 141. Here, the incident light beam is directed from the light source (not illustrated) into the emitting part 130, or from the light source into the emitting part 130 through an optical fiber 147 as illustrated in FIG. 4B. Also, the light curable bond 141 may be an ultraviolet curable resin cured by responding to an ultraviolet ray. In this case, the light source radiates the ultraviolet ray light onto the emitting part 130.

Referring to FIGS. 3, 4A and 4B, the emitting part 130 according to the present embodiment may be a concave groove shape 131 led-in or recessed from the emitting side 120*b* toward the joining side 120*a*. In particular, the emitting part 130 may be arranged to be perpendicular with respect to a surface on which the light curable bond 141 is spread. Accordingly, since a thickness D, of the joining part 120, in an area in which the emitting part 130 is provided, is thinner than a thickness $D_2$ in an area in which the emitting part 130 is not provided, light loss caused due to absorption of the scanned beam $D_4$ inside the joining part 120 can be decreased. Also, the light incident on the emitting part 130 in the shape of the concaved groove is reflected with the decreased surface reflection ratio by a geometric shape (or a concave groove shape) 131 of the emitting part 130. Accordingly, light loss caused due to the surface reflection in the emitting side 120*b* can be decreased.

The emitting part 130 is disposed between the light source and an area on which the light curable bond 141 is spread. That is, the emitting part 130 may have an area corresponding to an area of the light curable bond 141. The emitting part 130 may have at least a recessed or grooved portion recessed from a surface of the emitting side 120*b*. A recessed surface of the emitting part 130 may be curved with respect to a flat surface of the joining side 120*a*.

Figure 5A:
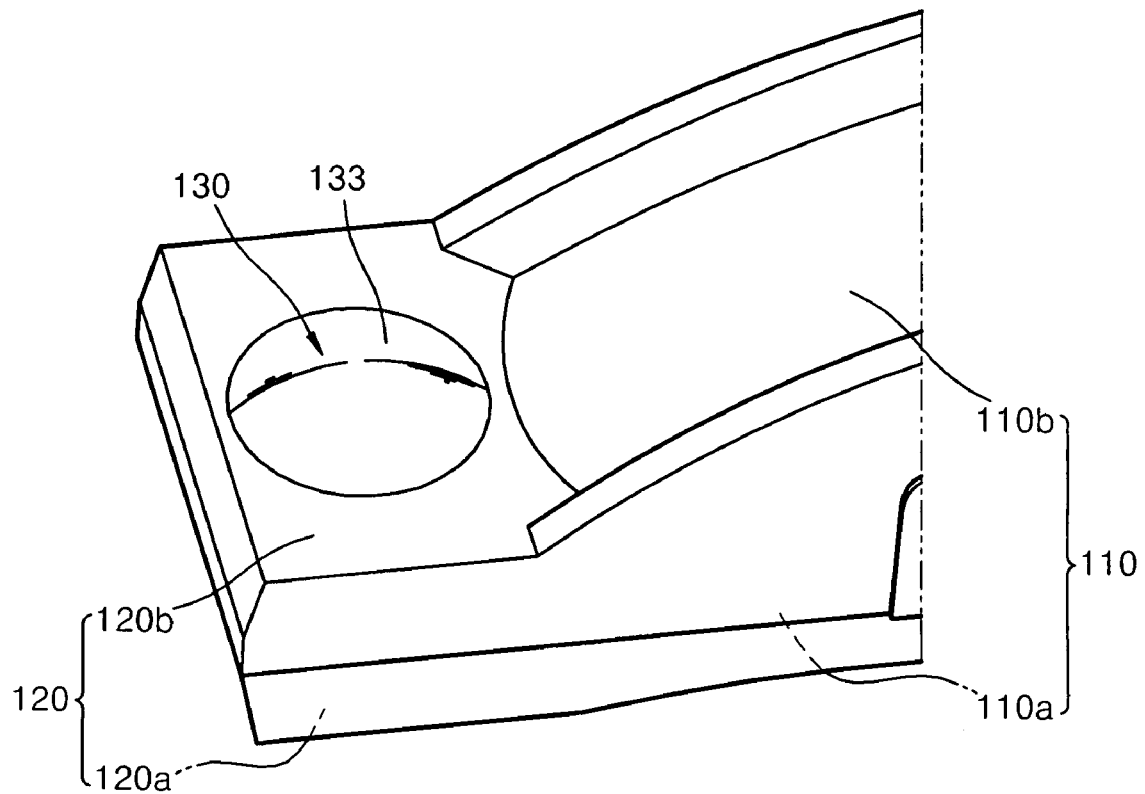
FIG. 5A is a perspective view illustrating an f-θ lens according to an exemplary embodiment of the present general inventive concept.
Figure 5B:
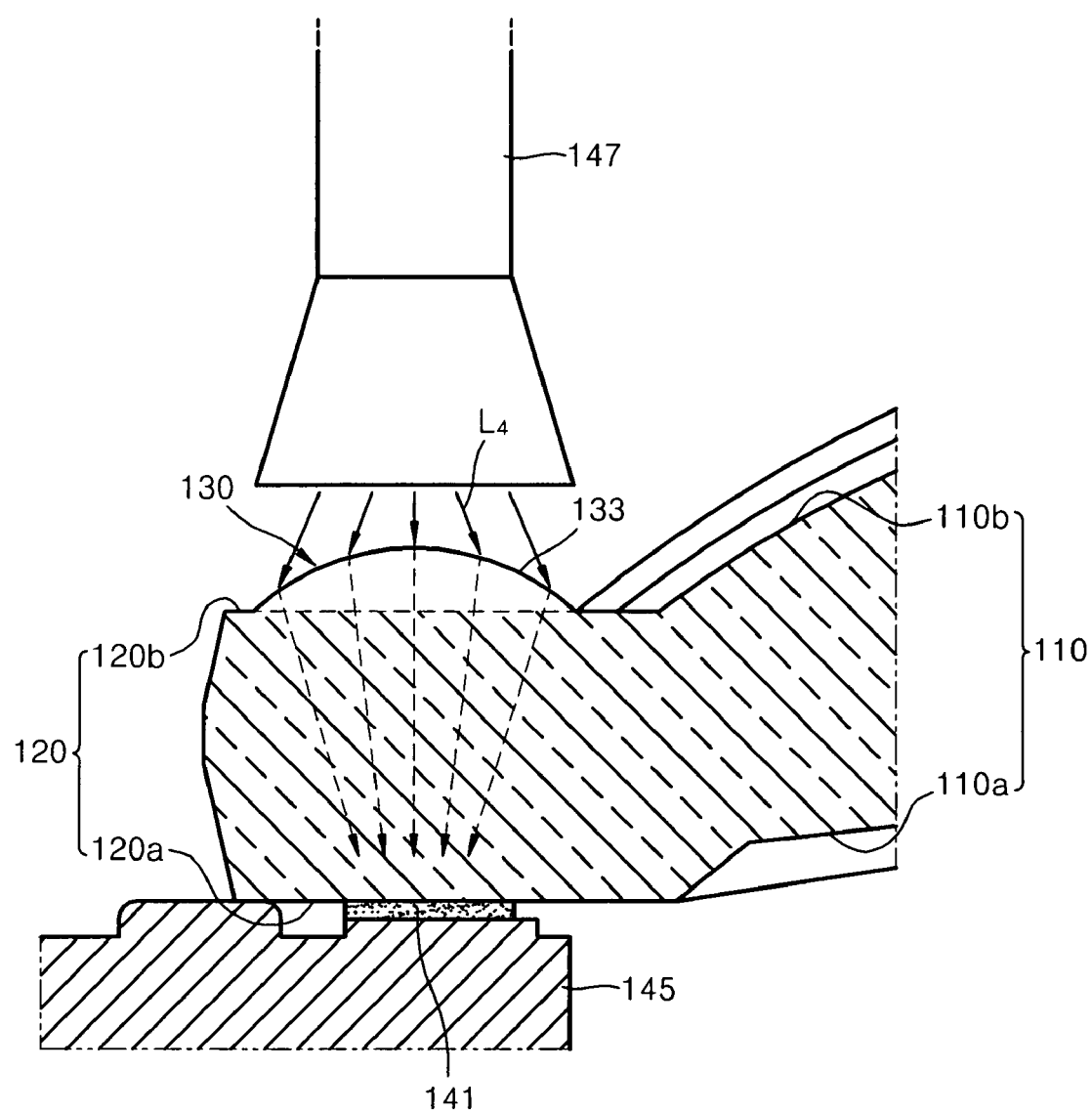
FIG. 5B is a sectional view illustrating a joining process of the f-θ lens of FIG. 5A according to an exemplary embodiment of the present general inventive concept.

As illustrated in FIGS. 5A and 5B, an f-θ lens according to an exemplary embodiment of the present general inventive concept includes a lens part 110, a joining part 120, and an emitting part 130. Here, the configuration of the lens part 110 and the joining part 120 in the f-θ lens of FIGS. 5A and 5B may be substantially the same as the f-θ lens 100 of FIGS. 4A and 4B. However, a shape of the emitting part 130 of FIGS. 5A and 5B may be changed or different from a shape of the emitting part 130 of FIGS. 4A and 4B. Accordingly, only the configuration of the emitting part 130 will be described in detail.

The emitting part 130 of FIG. 5A is formed in a convex shape 133 on the emitting side 120*b* to collimates the light beam $D_4$ radiated to the emitting part 130. That is, the emitting part 130 functions as an optical element having a positive refracting power, and the light beam $D_4$ radiated directly from a light source (not shown) or radiated from the light source through an optical fiber 147 is collimated by the emitting part 130, to be converged on the light curable bond 141. Accordingly, the loss of the light quantity by the surface reflection in the emitting part 130 can be decreased. Also, light beam entered from a wide area of the emitting part 130 is converged and scanned into a bonding area of the joining side 120*a* corresponding to the light curable bond 141, thereby enhancing the light scanning efficiency.

The emitting part 130 may have at least a curved surface to protrude from a surface of the emitting side 120*b*. The curved surface of the emitting part 130 may protrude with respect to a flat surface of the joining side 120*a*.

Figure 6A:
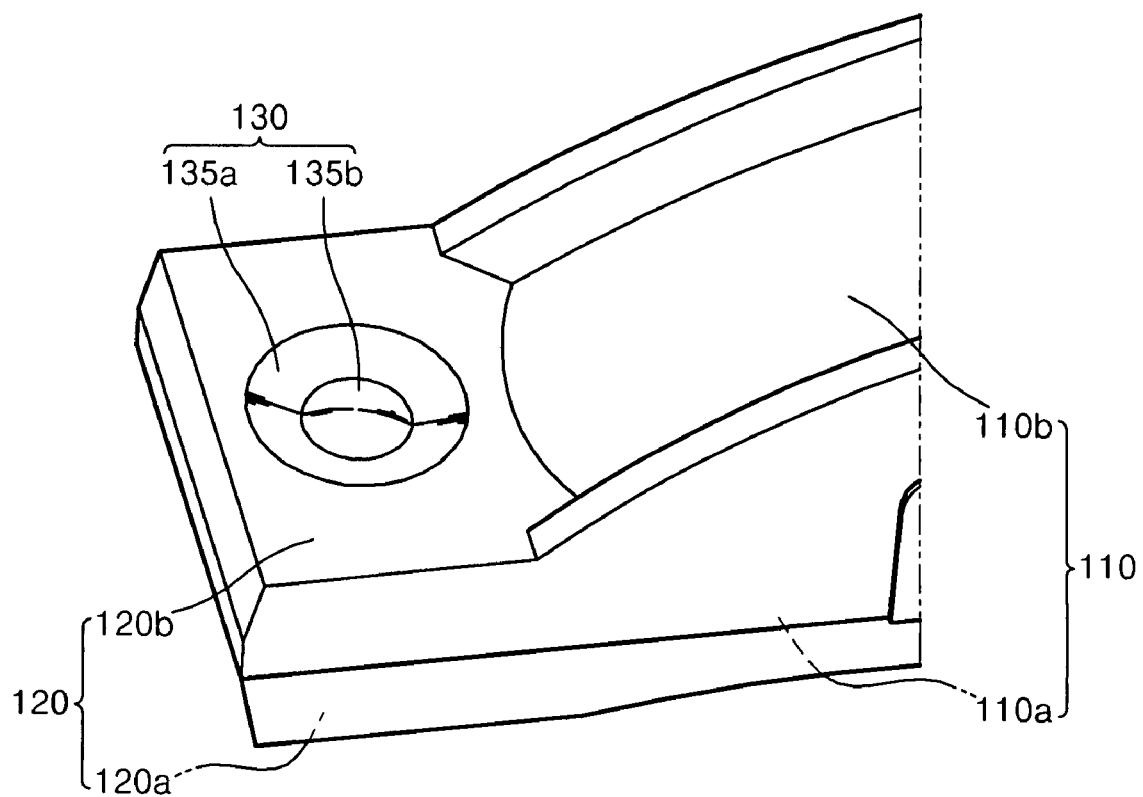
FIG. 6A is a perspective view illustrating an f-θ lens according to an exemplary embodiment of the present general inventive concept.
Figure 6B:
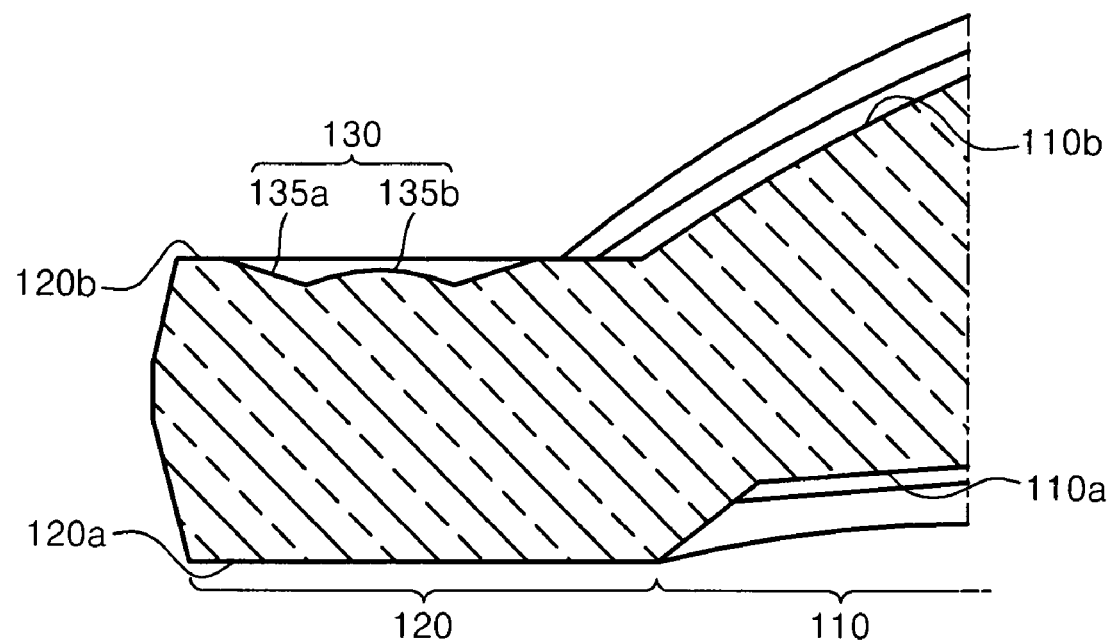
FIG. 6B is a sectional view illustrating the f-θ lens of FIG. 6A according to an exemplary embodiment of the present invention.

As illustrated in FIGS. 6A and 6B, an f-θ lens according to an exemplary embodiment of the present general inventive concept includes a lens part 110, a joining part 120, and an emitting part 130. Here, the configuration of the lens part 110 and the joining part 120 in the f-θ lens of FIGS. 6A and 6B may be substantially the same as the f-θ lens 100 of FIGS. 4A and 4B. However, the shape of the emitting part 130 of FIGS. 6A and 6B is changed and/or different from the shape of the emitting part 130 of FIGS. 4A and 4B. Accordingly, only the configuration of the emitting part 130 will be described in detail.

The emitting part 130 includes a concave part 135*a* which is led-in from the emitting part 120*b* toward the joining face 120*a*, and a convex part 135*b* which is convex-formed inside the concave part 135*a*. The concave part 135*a* is provided in a circular band shape as illustrated in FIGS. 6A and 6B. The joining part 120 in an area of the emitting part 130 has a thin thickness if the concave part 135*a* is formed in this way, and accordingly, it decreases a light absorption inside the joining part 120, thereby decreasing loss of the light quantity. The convex part 135*b* is formed inside the concave part 135*a* to collimate the incident light beam onto the joining face 120*a*. Accordingly, it performs the same function as the emitting part 130 of FIGS. 5A and 5B, to decrease loss of light quantity and enhance a light scanning efficiency.

The concave part 135*a* is recessed from a surface of the emitting side 120*b* and disposed between the surface of the emitting side 120*b* and the convex part 135*b*. An inner circumference of the concave part 135*a* may be an outer circumference of the convex part 135*b*. The convex part 135*b* may not protrude from the surface of the emitting side 120*b* and may be lower than the surface of the emitting side 120*b* and is surrounded by the circular band of the concave part 135*a*.

Figure 7A:
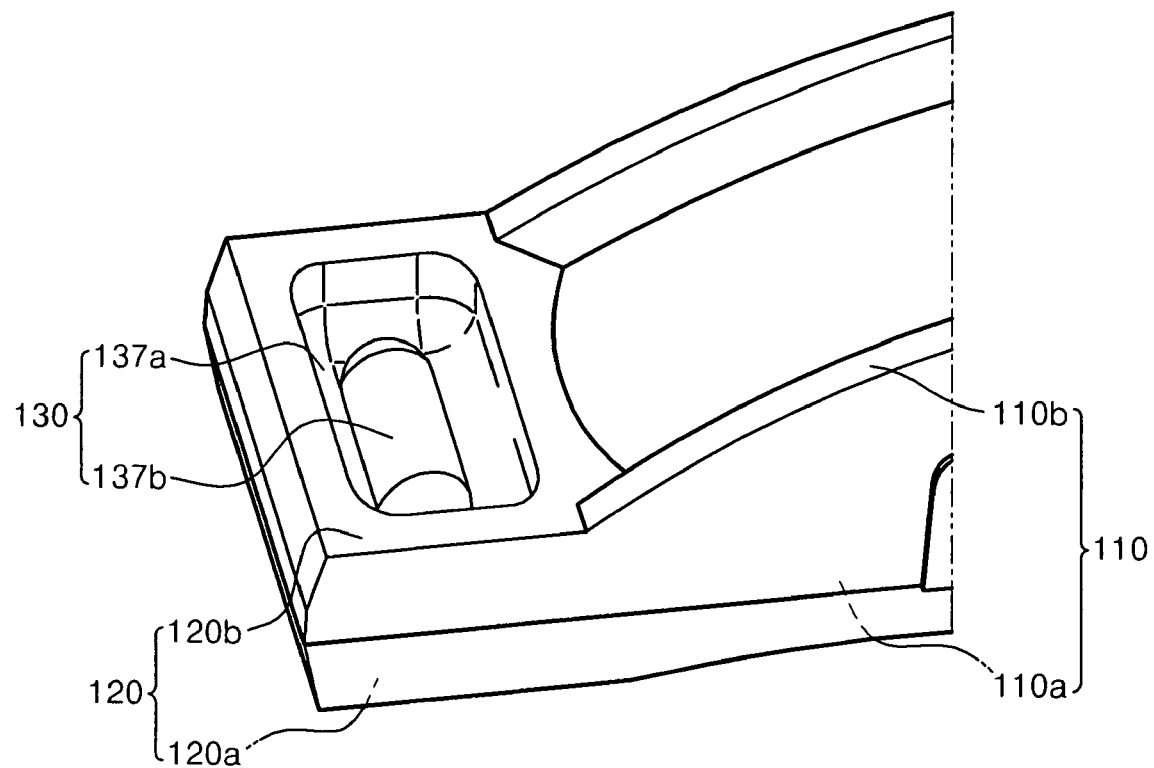
FIG. 7A is a perspective view illustrating an f-θ lens according to an exemplary embodiment of the present general inventive concept.
Figure 7B:
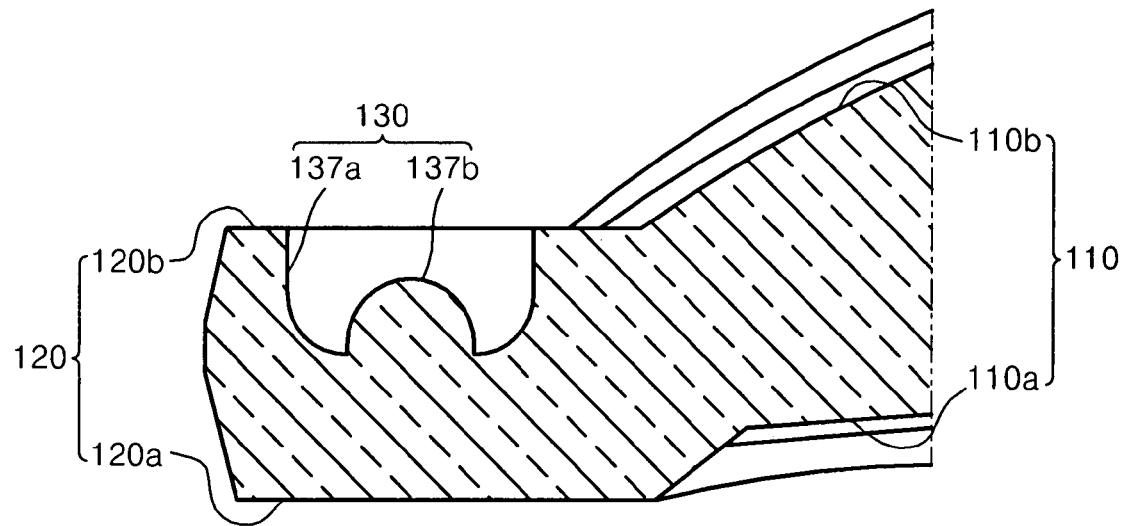
FIG. 7B is a sectional view illustrating the f-θ lens of FIG. 7A according to an exemplary embodiment of the present general inventive concept.

As illustrated in FIGS. 7A and 7B, an f-θ lens according to an exemplary embodiment of the present general inventive concept includes a lens part 110, a joining part 120 and an emitting part 130. Here, the configuration of the lens part 110 and the joining part 120 in the f-θ lens of FIGS. 7A and 7B may be substantially the same as the f-θ lens 100 of FIGS. 4A and 4B. Also, it is similar to the f-θ lens of FIGS. 6A and 6B in that the emitting part 130 includes a concave part 137*a* and a convex part 137*b* which is convex-formed inside the concave part 137*a*.

Meanwhile, the emitting part 130 of FIGS. 7A and 7B is distinguished from the emitting part 130 of FIGS. 6A and 6B in that the shape of the concave part 137*a* and the convex part 137*b* is changed. That is, the concave part 137*a* may be a rectangular shape in a predetermined area of the emitting face 120*b* like the shape of the emitting part 130 of FIGS. 4A and 4B. Also, the convex part 137*b* may have a projected configuration of a cylindrical shape inside the concave part 137*a*.

If the emitting part 130 is formed in the above-described structure, loss of light quantity by the surface reflection and the light absorption can be decreased through the concave part 137*a*, and the light can be converged on a bonding area of the joining face 120*a* according to the geometric shape of the convex part 137*b*, thereby enhancing a light incident efficiency.

The concave part 137*a* is recessed from a surface of the emitting side 120*b* and includes an inner circumference corresponding to a cylindrical outer circumference of the convex part 137*b*. The convex part 137*b* may include a semi-cylindrical body and portions of a semi circular shape disposed opposite ends of the semi-cylindrical body. The semi-cylindrical body has a shape formed by cutting off a cylindrical body along a longitudinal direction. The longitudinal direction of the semi-cylindrical body is disposed perpendicular to a longwise direction of the lens part 110. The convex part 137*b* may protrude from the inner circumference of the concave part 137*a* and may not protrude from the surface of the emitting side 120*b*.

Figure 8:
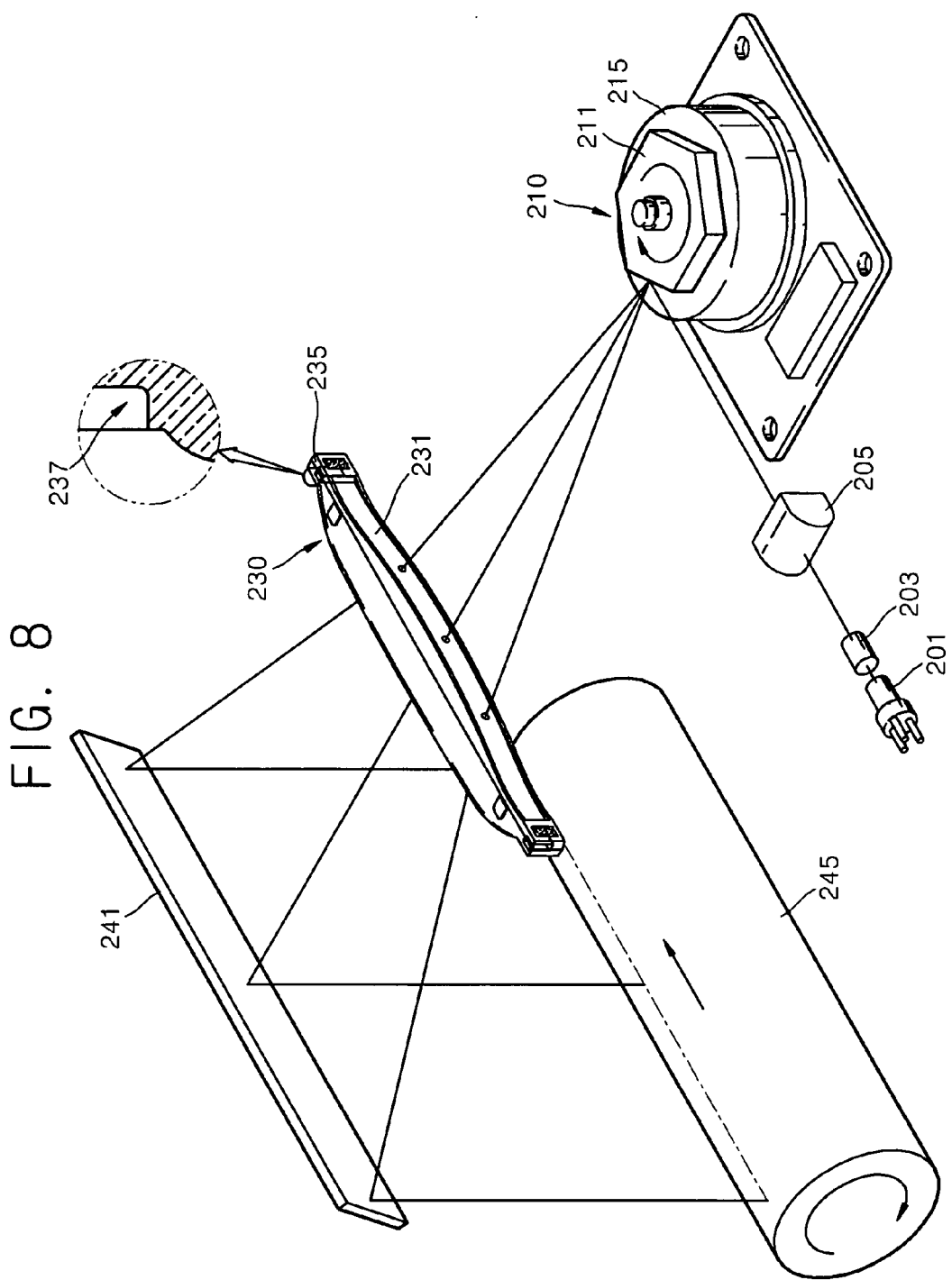
FIG. 8 is a view illustrating an optical arrangement of a light scanning unit according to an exemplary embodiment of the present general inventive concept.

As illustrated in FIG. 8, the light scanning unit according to an exemplary embodiment of the present general inventive concept includes a light source 201 which generates and radiates an incident beam, a beam deflector 210 which deflects an incident beam so that the incident beam exited from a beam source 201 can be main-scanned onto a photosensitive body 245, and an f-θ lens 230 which corrects an error included in the incident beam deflected by the beam deflector 210. Also, on an optical path between the light source 201 and the beam deflector 210 may be further provided a collimating lens 203 and a cylindrical lens 205. The collimating lens 203 collimates the incident beam radiated from the light source 201, and the cylindrical lens 205 shapes the incident beam collimated by the collimating lens 203. Also, between the f-θ lens 230 and the photosensitive body 245 may be further provided a reflecting mirror 241 which changes a direction of the scanned incident beam.

The beam deflector 210 includes a driving source 215, and a rotational polygon mirror 211 which is rotated by the driving source 215. Accordingly, the incident beam radiated from the light source 201 changes its reflected direction according to the rotation of the rotational polygon mirror 211 to determine its scanning direction.

The f-θ lens 230 corrects an astigmatism included in the incident beam deflected by the beam deflector 210, and corrects the scanning line to maintain an isometric line and an isometric angle. The f-θ lens 230 includes a singular lens so as to reduce the number of parts and a manufacturing cost. More desirably, the f-θ lens 230 may include a singular aspherical surface lens having a different curvature radius with respect to the main scanning direction and the sub scanning direction.

Referring to FIGS. 4A, 4B, and 8, if the f-θ lens 230 is disposed on an optical path, it is installed on the mount 145 with which the f-θ lens 230 is joined by the light curable bond 141. For this purpose, the f-θ lens 230 includes a lens part 231 which functions as a lens, a joining part 235 which is extended from the lens part 231, and an emitting part 237 formed in the joining part to have a configuration to enhance a use efficiency of the radiated light source in the joining process by the light curable bond 237. Here, the description of the configuration of the f-θ lens 230 will be omitted as it is substantially the same as the f-θ lens according to the exemplary embodiments of the present general inventive concept described by referring to FIGS. 3 to 7B.

Figure 9:
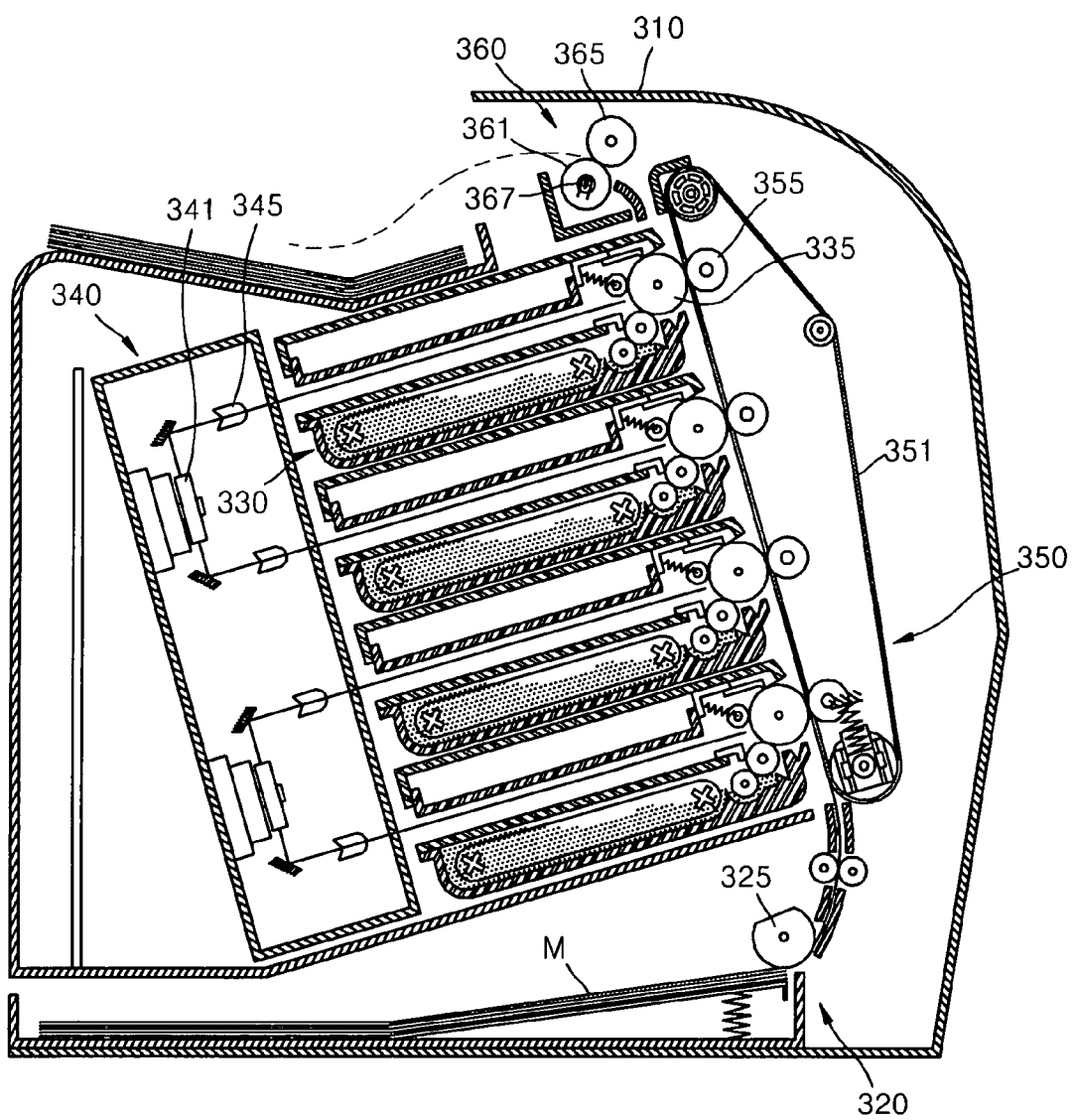
FIG. 9 is a schematic view illustrating an image forming apparatus according to an exemplary embodiment of the present general inventive concept.

As illustrated in FIG. 9, an image forming apparatus according to an exemplary embodiment may be a tandem-type image forming apparatus. The image forming apparatus includes a cabinet 310, a developing unit 330 which is mounted inside the cabinet 310, a light scanning unit 340, a transfer unit 350 and a fusing unit 360.

The cabinet 310 forms an exterior appearance of the image forming apparatus. In the inside of the cabinet 310 is detachably provided a supplying unit 320 which supplies a printing medium M. The printing medium M which is supplied from the supplying unit 320 is picked up through a pick up roller 325 to be transferred between the developing unit 330 and the transfer unit 350 through the transferring route.

The developing unit 330 includes a photosensitive body 335 which responds to the beam scanned from the light scanning unit 340 to form an electrostatic latent image. The developing unit 330 develops the electrostatic latent image of the photosensitive body 335 with toner accommodated therein, to form a toner image on the photosensitive body 335.

The developing unit 330 may include a plurality of developing units to supply toners of a plurality of colors so as to form a full color image in a single-pass type. FIG. 9 illustrates a configuration having four units as an example so as to form an image with yellow (Y), magenta (M), cyan (C), and black (K).

The light scanning unit 340 scans an incident beam to form an electrostatic latent image on each of the plurality of photosensitive bodies 335. For this purpose, the light scanning unit 340 has a multi-beam light scanning configuration to scan the incident beam onto the plurality of photosensitive bodies 335 at the same time. Also, the light scanning unit 340 includes a light source (not shown), a beam deflector 341 which deflects the incident beam radiated from the light source, and an f-θ lens 345 which scans a flux deflected by the beam deflector onto the scanning surface to form an image thereon. Here, the light source may have a configuration having a plurality of radiant points or may include the plurality of semiconductor devices having each singular radiant point corresponding to each of the colors. Also, the beam deflector 341 may include two polygon mirrors as shown in FIG. 9. In this case, each of the polygon mirrors deflects two incident beams radiated from the light source onto different routes. The f-θ lens 345 is provided on each of the four routes deflected from the beam deflector 341. Accordingly, the incident beam can be separately scanned with respect to the plurality of photosensitive bodies 335 disposed adjacent to each other.

Here, the description of the configuration of the light scanning unit 340 will be omitted as it is substantially the same as the light scanning unit according to the above-described exemplary embodiment of the present general inventive concept.

The transfer unit 350 is disposed to face the photosensitive bodies 335 along the printing medium M transferred through the transferring path, and transfers a toner image which is formed on the photosensitive bodies 335 to the supplied printing medium M. For this purpose, the transfer unit 350 includes a transfer belt 351 and a transfer backup roller 355 which are disposed to face the plurality of photosensitive bodies 335. The image transferred to the printing medium M through the transfer unit 350 is fused through the fusing unit 360.

The fusing unit 360 includes a heating roller 361, a pressing roller 365 and a heat source 367. Accordingly, the heating roller 361 heats its surface by heat generated in the heat source 367 provided therein, and fuses the image transferred to the printing medium M by the heating roller 365 cooperating with the pressing roller 365.

As described above, an f-θ lens, and a light scanning unit and an image forming apparatus which are employing the same form an emitting part in an joining part, thereby preventing depreciation of light efficiency due to surface reflection and internal absorption of beam, by joining through a light curable resin when the f-θ lens is installed by joining on a predetermined optical path through a light curable resin.

Accordingly, a problem that a joining time for the f-θ lens may be occurred by the increase of the thickness of the f-θ lens can be solved without employing a separate ultraviolet ray scanning unit and an ultraviolet lamp. Accordingly, a facility cost for the separate ultraviolet ray emitting unit is unnecessary, and the assembling time for joining is reduced, thereby enhancing productivity of the light scanning unit. Also, a manufacturing cost for an image forming apparatus can be lowered by employing the above-described light scanning unit.

Although a few exemplary embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An f-θ lens usable with a light scanning unit to form an image on a photosensitive body, comprising:
   a lens part which has an incident side on which a deflected beam is incident, and an exiting side from which the entered deflected beam is exited;
   a joining part which has a joining side which is extended from the incident side and include an area to be formed with a light curable bond, and an emitting side which is extended from the exiting side and disposed to face the joining side, so that a light beam for curing the light curable bond is transmitted to the area of the joining side through the emitting side and the joining side; and
   an emitting part which is formed on the emitting side in a non-planar shape and provided to decrease loss of light quantity of the light beam scanned on the emitting side, wherein the emitting part comprises:
      a concave part formed from the emitting part toward the joining face; and
      a convex part having a convex portion formed inside the concave part to converge the entered beam onto the joining face.

2. The f-θ lens according to claim 1, wherein the light curable bond comprises a non-ultraviolent light curable adhesive.

3. A light scanning unit usable in an image forming apparatus, comprising:
   a light source which radiates incident beam;
   a beam deflector which deflects the incident beam radiated from the light source onto a main scanning direction of a photosensitive body; and
   an f-θ lens which includes a lens part which has an incident side on which a deflected beam is incident, and an exiting side from which the entered deflected beam is exited, a joining part which has a joining side which is extended from the incident side and include an area to be formed with a light curable bond, and an emitting side which is extended from the exiting side and disposed to face the joining side, so that a light beam for curing the light curable bond is transmitted to the area of the joining side through the emitting side and the joining side, and an emitting part which is formed on the emitting side in a non-planar shape and provided to decrease loss of light quantity of the light beam scanned on the emitting side, so that an image is formed on the photosensitive body according to the deflected beam,
   wherein the emitting part comprises:
      a concave part which is led-in from the emitting part toward the joining side; and
      a convex part which is convex-formed inside the concave part to collimate the entered beam onto the joining side.

4. The light scanning unit according to claim 3, further comprising:
   a collimating lens which collimates the incident beam radiated from the light source; and
   a cylindrical lens which shapes the incident beam collimated by the collimating lens between the light source and the beam deflector.

5. The light scanning unit according to claim 3, wherein the f-θ lens comprises a singular aspherical lens having a different curvature radius with respect to the main scanning direction and the sub scanning direction.

6. An image forming apparatus, comprising:
   a photosensitive body on which an electrostatic latent image is formed;
   a light scanning unit which includes a beam deflector which deflects the incident beam radiated from a light source onto a main scanning direction of a photosensitive body, and an f-θ lens which includes a lens part which has an incident side on which a deflected beam is incident, and an exiting side from which the entered deflected beam is exited, a joining part which has a joining side which is extended from the incident side and include an area to be formed with a light curable bond, and an emitting side which is extended from the exiting side and disposed to face the joining side, so that a light beam for curing the light curable bond is transmitted to the area of the joining side through the emitting side and the joining side, and an emitting part which is formed on the emitting side in a non-planar shape and provided to decrease loss of light quantity of the light beam scanned on the emitting side, so as to scan the incident beam to form an electrostatic latent image on the photosensitive body;
   a developing unit which forms a toner image on the photosensitive body;
   a transfer unit which transfers the toner image formed on the photosensitive body onto a printing medium; and
   a fusing unit which fuses the image transferred on the printing medium,
   wherein the emitting part comprises:
      a concave part which is led-in from the emitting side toward the joining side; and
      a convex part which is formed inside the concave part in a convex shape to collimate the entered light beam onto the joining side.

7. The image forming apparatus according to claim 6, further comprising:
   a collimating lens which collimates the incident beam radiated from the light source; and
   a cylindrical lens which forms the incident beam collimated by the collimating lens between the light source and the beam deflector.

8. The image forming apparatus according to claim 6, wherein the f-θ lens comprises a singular aspherical lens having a different curvature radius with respect to the main scanning direction and the sub scanning direction.

9. An f-θ lens usable with a light scanning unit of an image forming apparatus, comprising:
   a lens part having a first lens function to control an incident beam passing through the lens part and exiting from an emitting side of the lens part;
   a joining part extended from the lens part; and
   an emitting part formed in the joining part to have a second lens function to control a light beam passing through the joining part,
   wherein the emitting part comprises a concave portion formed at a substantially acute angle with a surface of the joining part along the emitting side and is led-in from the emitting side toward a joining side of the joining part; and a convex part which is formed inside the concave part in a convex shape to collimate the entered light beam onto the joining side.

10. An f-θ lens usable with a light scanning unit of an image forming apparatus, comprising:
   a lens part having a thickness varying in a lengthwise direction to control an incident beam passing therethrough along the lengthwise direction;
   a joining part extended from the lens part and having a second thickness in the lengthwise direction; and an emitting part formed in the joining part and having a thickness varying with respect to the lengthwise direction to control a light beam passing therethrough,
wherein the emitting part comprises:
 a concave part which is led-in from an emitting side of the emitting part toward a joining side of the joining part; and
 a convex part which is formed inside the concave part in a convex shape to collimate the entered light beam onto the joining side.

* * * * *